United States Patent
Fuller et al.

(10) Patent No.: US 8,587,474 B2
(45) Date of Patent: Nov. 19, 2013

(54) RESOLUTION RADAR USING METAMATERIALS

(75) Inventors: Christopher Fuller, Bloomington, MN (US); John R. Lamberg, Minnetonka, MN (US); John J. Geddes, Minneapolis, MN (US); Michael J. Gawronski, Minneapolis, MN (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

(21) Appl. No.: 13/086,713

(22) Filed: Apr. 14, 2011

(65) Prior Publication Data

US 2011/0187577 A1 Aug. 4, 2011

Related U.S. Application Data

(63) Continuation of application No. 11/955,795, filed on Dec. 13, 2007, now Pat. No. 7,928,900.

(60) Provisional application No. 60/875,323, filed on Dec. 15, 2006.

(51) Int. Cl.
G01S 7/02 (2006.01)
H01Q 3/46 (2006.01)
G01S 13/00 (2006.01)
H01Q 3/00 (2006.01)

(52) U.S. Cl.
USPC .......... 342/175; 342/5; 342/11; 342/21; 342/22; 342/27; 342/73; 342/74; 342/81; 342/82; 342/89; 342/368; 343/700 R; 343/753; 343/907; 343/909

(58) Field of Classification Search
USPC ............. 342/5–12, 22, 27, 28, 82, 89, 175, 342/368–377, 21, 70–81; 343/700 R, 343/753–755, 792.5, 700 MS, 911 R, 343/907–916, 757; 333/219, 235; 29/592, 29/592.1, 602.1
See application file for complete search history.

(56) References Cited

U.S. PATENT DOCUMENTS

| | | | |
|---|---|---|---|
| 649,621 A | 5/1900 | Tesla | |
| 685,958 A | 11/1901 | Tesla | |
| 3,535,543 A | 10/1970 | Dailey | |
| 3,933,323 A | 1/1976 | Dudley | |
| 4,078,747 A | 3/1978 | Minovitch | |
| 4,955,562 A | 9/1990 | Martin | |
| 5,633,972 A | 5/1997 | Walt et al. | |
| 6,181,293 B1 | 1/2001 | Muhlhauser | |
| 6,621,448 B1 * | 9/2003 | Lasky et al. | 342/22 |
| 6,661,392 B2 | 12/2003 | Isaacs et al. | |
| 6,731,248 B2 | 5/2004 | Killen et al. | |

(Continued)

OTHER PUBLICATIONS

T.W. Ebbesen, H.J. Lezec, H.F. Ghaemi, T. Thio, P.A. Wolff, "Extraordinary Optical Transmission through Sub-Wavelength Hole Arrays", Nature, vol. 391, pp. 667-669, 1998.

(Continued)

Primary Examiner — Bernarr Gregory
(74) Attorney, Agent, or Firm — Vidas, Arrett, Steinkraus, P.A.

(57) ABSTRACT

A radar system includes at least one transmit array comprising a plurality of metamaterial elements. The radar system further includes at least one near-field stimulator for inputting electromagnetic signal to the transmit array so that a sub-wavelength target is illuminated with an electromagnetic wave.

18 Claims, 6 Drawing Sheets

(56) References Cited

U.S. PATENT DOCUMENTS

| | | | |
|---|---|---|---|
| 6,734,827 B2 | 5/2004 | Killen et al. | |
| 6,938,325 B2 | 9/2005 | Tanielian | |
| 6,958,729 B1 | 10/2005 | Metz | |
| 7,015,865 B2 * | 3/2006 | Isaacs et al. | 343/757 |
| 7,218,285 B2 | 5/2007 | Davis et al. | |
| 7,256,753 B2 | 8/2007 | Werner et al. | |
| 7,301,493 B1 | 11/2007 | Canales et al. | |
| 7,525,711 B1 | 4/2009 | Rule et al. | |
| 7,724,180 B2 * | 5/2010 | Yonak et al. | 342/70 |
| 7,728,772 B2 | 6/2010 | Mortazawi et al. | |
| 7,733,265 B2 * | 6/2010 | Margomenos et al. | 342/70 |
| 7,741,734 B2 | 6/2010 | Joannopoulos | |
| 7,791,355 B1 | 9/2010 | Esher | |
| 2004/0164915 A1 | 8/2004 | Quan | |
| 2005/0225492 A1 | 10/2005 | Metz | |
| 2006/0028385 A1 | 2/2006 | Davis et al. | |
| 2006/0266917 A1 | 11/2006 | Baldis | |
| 2007/0057852 A1 | 3/2007 | Leizerovich | |
| 2007/0138402 A1 | 6/2007 | Hyde et al. | |
| 2008/0001684 A1 | 1/2008 | Itoh | |
| 2008/0014897 A1 | 1/2008 | Cook | |
| 2009/0015075 A1 | 1/2009 | Cook | |
| 2009/0135086 A1 | 5/2009 | Fuller | |
| 2010/0033021 A1 | 2/2010 | Bennett | |
| 2010/0039234 A1 | 2/2010 | Soliven | |
| 2010/0109445 A1 | 5/2010 | Kurs | |
| 2010/0123530 A1 | 5/2010 | Park | |
| 2010/0141042 A1 | 6/2010 | Kesler | |
| 2010/0148589 A1 | 6/2010 | Hamam | |
| 2010/0164296 A1 | 7/2010 | Kurs | |
| 2010/0164297 A1 | 7/2010 | Kurs | |
| 2010/0164298 A1 | 7/2010 | Karalis | |
| 2010/0171368 A1 | 7/2010 | Schatz | |
| 2010/0181843 A1 | 7/2010 | Schatz | |
| 2010/0181845 A1 | 7/2010 | Fiorello | |
| 2010/0201203 A1 | 8/2010 | Schatz | |
| 2010/0219694 A1 | 9/2010 | Kurs | |
| 2010/0231340 A1 | 9/2010 | Fiorello | |
| 2010/0237709 A1 | 9/2010 | Hall | |
| 2010/0259108 A1 | 10/2010 | Giler | |
| 2010/0259110 A1 | 10/2010 | Kurs | |
| 2010/0264747 A1 | 10/2010 | Hall | |
| 2010/0277121 A1 | 11/2010 | Hall | |
| 2010/0277387 A1 | 11/2010 | Schantz | |
| 2010/0289342 A1 | 11/2010 | Maness | |

OTHER PUBLICATIONS

J.B. Pendry, A.J. Holden, D.J. Robbins, and W.J. Stewart, "Magnetism from Conductors and Enhanced Nonlinear Phenomena", IEEE Trans. Microwave Theory Tech., vol. 47, No. 11, pp. 2075-2084, Nov. 1999.

David Smith, "Superlens breaks optical barrier", Physics Web, Aug. 2005, http://www.physicsweb.org/articles/world/18/8/4.

N. Fang, X. Zhang, "Imaging Properties of a Metamaterial Superlens", Appl. Phys. Lett., vol. 82, No. 2, pp. 161-163, Jan. 2003; 23. Nassenstein, A. Phys. Lett. 29a, 175 (1969).

Wolf, E. and Nieto-Vesperinas, "Analyticity of the angular spectrum amplitude of scattered fields and some of its consequences", J. Opt. Soc. Am. A, vol. 2, No. 6, 886-890 (Jun. 1985).

Jaewon Kim and Anand Gopinath, "Application of Cubic High Dielectric Resonator Metamaterial to Antennas", presented in session 220 at IEE Antenna and Propagation Society conference in Jun. 2007.

Chew et al., "Elastic scattering of evanescent electromagnetic waves", Applied Optics, vol. 18, No. 15, Aug. 1979, pp. 2679-2687.

A. Karalis et al., "Efficient wireless non-radiative mid-range energy transfer", Annals of Physics 323 (2008) 34-48.

Rebecca Boyle, "Metamaterial Lenses Could Allow Easy Wireless Power Transmission", May 23, 2011, Copyright © 2009 Popular Science.

Yaroslav Urzhumov et al., "Metamaterial-Enhanced Coupling between Magnetic Dipoles for Efficient Wireless Power Transfer" [physics.class-ph] pp. 1-23, Feb. 11, 2011.

"How Metamaterials Will Boost Wireless Power Transmission" The Physics arXiv Blog, © 2011 MIT Technology Review.

International Search Report mailed Dec. 20, 2011 for PCT Application No. PCT/US11/56870, filed Oct. 19, 2011.

Written Opinion mailed Dec. 20, 2011 for PCT Application No. PCT/US11/56870, filed Oct. 19, 2011.

* cited by examiner

RESOLUTION RADAR USING METAMATERIALS

CROSS-REFERENCE TO RELATED APPLICATIONS

This application is a continuation application of U.S. patent application Ser. No. 11/955,795, filed on Dec. 13, 2007, now U.S. Pat. No. 7,928,900, which claims the benefit of U.S. Provisional Application No. 60/875,323, filed on Dec. 15, 2006, the entire contents of each being hereby incorporated by reference.

STATEMENT REGARDING FEDERALLY SPONSORED RESEARCH

Not Applicable

BACKGROUND

1. Field

The invention relates to antenna systems and in particular to antenna systems used in radar applications.

2. Description of the Related Art

The resolution of all lens-based instruments is defined by the finite dimensions of the electromagnetic wave used by a lens. The resolving power, or the minimum separation between two points which can be resolved ($d_{min}$), can be approximated by $\lambda/2$, where $\lambda$ is the wavelength of light. This limitation is the result of diffraction that takes place because of the wave nature of electromagnetic radiation. Moreover, it should be noted that the resolution limit described above arises from the assumption that the image of an object is being detected in the "far-field", that is, a distance at which the far-field dominates over all other aspects of the electromagnetic radiation. For these reasons, where resolution is limited to no better than one-half of the wavelength of electromagnetic radiation being used, such imaging is termed "far-field" imaging or diffraction-limited viewing.

Conventional far-field imaging techniques are unable to use the "near-field" component of the radiated field. The near-field component of a radiated field is a standing wave, as compared to the traveling wave of the far-field component. As such, the near-field is evanescent in conventional systems because it decays very rapidly as distance increases from the object of interest, often at $r^3$ or greater, where r is the distance from the object of interest. For several types of radio antennas, it should be noted that although the near-field exists, its amplitude is significantly weaker than the far-field for $R > [2D^2]/\lambda$, where $\lambda$=the wavelength, D=the antenna size, and R=the radial distance from the antenna. The boundary between the near-field and the far-field is conservatively estimated at approximately $\lambda/16$ from the antenna or object of interest.

An increasingly important and rapidly developing alternative to conventional lens-based imaging is the "near-field" technique which provides superresolution imaging. The term "superresolution" defines any means for optical imaging or spectroscopy that permits spatial resolution which exceeds the diffraction limitation caused by the wave nature of electromagnetic energy; and provides a resolution which is less than one-half the wavelength of the light actually being used. All superresolution near-field imaging and scanning near-field optical microscopy ("SNOM") is based on the fact that although light cannot be focused to a spot less than one-half the wavelength of light ($\lambda/2$), it can be directed through a device or article which reduces the size of the light energy to dimensions smaller than $\lambda/2$ via near-field detection.

The basic principle of near-field viewing and imaging is best illustrated by the aperture technique as is illustrated by FIG. 1. When light is directed through a subwavelength (i.e. sub-$\lambda$) sized hole, the portion of energy that passes through the hole will at first be confined to the dimensions of the aperture. The exiting light being of subwavelength dimensions will then diffract; however, there will be a distinct region in the vicinity of the aperture called the "near-field" where the existing light beam retains the approximate dimensions of the hole. If this subwavelength light beam within the near-field region is used to raster scan the surface of an object, a two-dimensional image can be created in a serial fashion (one point at a time).

In addition to near-field imaging techniques, image resolution can be improved by using metamaterials. Metamaterials are artificial media with unusual electromagnetic properties that result in negative permittivity $\in$, permeability $\mu$, and/or negative index of refraction $N(N=\sqrt{(\in\mu)})$, that are controlled by the design of the material. Metamaterials are well-known by those of skill in the art and their theory and construction is beyond the scope of what will be discussed here. For more information on the theory of metamaterials and their uses, the reader is directed to the following sources: T. W. Ebbesen, H. J. Lezec, H. F. Ghaemi, T. Thio, P. A. Wolff, "Extraordinary Optical Transmission through Sub-Wavelength Hole Arrays", Nature, Vol. 391, pp. 667-69, 1998; Anthony Holden, "Inside the Wavelength: Electromagnetics in the Near Field", Foresight Directorate, http://www.foresight.gov.uk; J. B. Pendry, A. J. Holden, D. J. Robbins, and W. J. Stewart, "Magnetism from Conductors and Enhanced Nonlinear Phenomena", IEEE Trans. Microwave Theory Tech., Vol. 47, No. 11, pp. 2075-2084, November 1999; David Smith, "Superlens breaks optical barrier", PhysicsWeb, August 2005, http://www.physicsweb.org/articles/world/18/8/4; 4; N. Fang, X. Zhang, "Imaging Properties of a Metamaterial Superlens", Appl. Phys. Lett., Vol. 82, No. 2, pp. 161-163, January 2003; 23. Nassenstein, H. Phys. Lett. 29a, 175 (1969); Chew, H., D.-S. Wang and Kerker M. Appl. Opt. 18, 2679 (1979); Wolf, E. and Nieto-Vesperinas, M. J. Opt. Soc. Am. A 2, 886 (1985). The entire contents of each are incorporated herein by reference.

It may be helpful to provide a tangible example of the effects of metamaterials by comparing how a beam of light is affected by a material with a negative refractive index (a metamaterial) and a material with a positive refractive index, such as glass. If the light beam strikes the surface of the material at an acute angle relative to the surface, the beam of light will enter the material and refract, or bend, away from the angle at which it entered the material. In general, a conventional material having a positive refractive index, such as glass, the beam of light will refract slightly toward the normal (i.e. an imaginary line perpendicular to the surface of the material at the point of the beam's entry), and continue through the material on the opposite side of the normal. However, with a metamaterial having a negative refractive index, the beam of light will refract greatly by staying on the same side of the normal. It will be appreciated that this has profound applications for near-field imaging. Because the near-field decays so rapidly, if it is combined with a metamaterial having a negative refractive index, the rapid decay can be controlled by placing a metamaterial within the near-field, thereby allowing the near-field component to be captured. Once the near-field is captured, it is possible to process both the far-field and the near-field components to dramatically improve the image resolution.

Information relevant to attempts to use metamaterials in antenna systems can be found in U.S. Pat. Nos. 6,958,729 and 7,218,285. However, both of these references suffers from one or more of the following disadvantages: not enhancing the near-field component of the wave, not using near-field probes, not using sub-wavelength illumination, not utilizing for metal penetration, and not detecting the near-field of the source or object to be imaged.

For the foregoing reasons, there is a need for an improved resolution radar system that can enhance the near-field component of the wave, use near-field probes, and use sub-wavelength illumination.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

SUMMARY OF THE INVENTION

In one embodiment, the radar system comprises at least one metamaterial transmit array and at least one near-field stimulator. The transmit array has a near-field and comprises a plurality of metamaterial elements, the metamaterial elements comprising a first lens. The near-field stimulator is used for inputting an electromagnetic signal to the transmit array so that a sub-wavelength sized target is illuminated with an electromagnetic wave.

In another embodiment, the near-field stimulator is selected from the group consisting of a near-field probe, a port, an antenna, or a combination thereof.

In some embodiments, the electromagnetic wave has a frequency of less than about 1.5 GHz.

In at least one embodiment, the electromagnetic wave has a frequency between about 50 kHz and about 600 MHz.

In another embodiment, the electromagnetic wave has a frequency of about 100 kHz.

In at least one embodiment, the radar system further comprises an antenna.

In another embodiment, the radar system comprises at least one first control component in operative communication with the transmit array. In some embodiments, the first control component may be a varactor, pin diode network, gyrator, load/impedance pull, saturable magnetic, modulation/frequency control, or other tunable resonator components or sub-circuits, or a combination thereof.

In at least one embodiment, the electromagnetic wave has a frequency and incident power level sufficient to penetrate metal.

In another embodiment, the metamaterial elements forming the first lens are selected from the group consisting of an integrated circuit or resonator, a distributed circuit or resonator, and a lumped element circuit or resonator, or a combination thereof.

In another embodiment, the electromagnetic wave is sufficient to damage electronics enclosed in metal with or without burning through the metal.

In at least one embodiment, the radar system further comprises a plurality of metamaterial resonators, the resonators being dispersed near an object of interest so that clutter noise may be reduced, or being dispersed in a region of interest so that changes in the region may be detected.

In at least one embodiment, the radar system further comprises at least one metamaterial receive array constructed and arranged to receive a return wave reflected from an object of interest. The return wave comprises a near-field component and a far-field component. The return wave has a frequency less than about 1 GHz. The receive array comprises a plurality of metamaterial elements, the plurality of metamaterial elements comprising a second lens. The radar system further comprises at least one near-field sensing component in operative communication with the at least one receive array. The radar system further comprises a far-field filter circuit/array constructed and arranged to separate the far-field component and the near-field component.

In another embodiment, the metamaterial elements forming the second circuit are selected from the group consisting of an integrated circuit or resonator, a distributed circuit or resonator, and a lumped element circuit or resonator, or a combination thereof.

In another embodiment, the radar system comprises an amplitude discrimination component.

In yet another embodiment, the radar system includes a far-field conditioning component, a near-field conditioning component, a far-field processing component, a near-field processing component, and a signal combining and processing component.

In still another embodiment, the near-field sensing component is selected from the group consisting of at least one near-field probe, at least one high impedance probe, at least one transmission line port, at least one antenna array, or a combination thereof.

In another embodiment, the radar system comprises at least one first control component in operative communication with the transmit array. In some embodiments, the first control component may be a varactor, pin diode network, gyrator, load/impedance pull, saturable magnetic, modulation/frequency control, or other tunable resonator components or sub-circuits, or a combination thereof.

In yet another embodiment, the system further comprises at least one second control component in operative communication with the receive array. In some embodiments, the second control component may be a varactor, pin diode network, gyrator, load/impedance pull, saturable magnetics, modulation/frequency control, or other tunable resonator components or sub-circuits, or a combination thereof.

In another embodiment, the system further comprising a far-field filter circuit, the far-field filter circuit in operative communication with the at least one receive array and/or the at least one transmit array, the far-field filter circuit constructed and arranged to separate the far-field component and the near-field component.

In another embodiment, the radar system includes tuning components or combinations of tuning components in order to perform a mixing function at the metamaterial element or lens itself for the function of eliminating components from the system, optimizing noise figure, blanking the front-end receiver for protection and other purposes.

In another embodiment, the radar system includes composites combining high permittivity materials with matched high permeability materials. By utilizing such composites, the size of the metamaterial elements and lenses may be made dramatically smaller without sacrificing efficiency. Also, by matching the permittivity and permeability the intrinsic impedance of air is matched allowing an incident electromagnetic wave to pass into the lens with minimal reflections. The technique applies to isotropic and anisotropic materials. The metamaterial resonators may be comprised of the high permeability and permittivity materials or the metamaterial resonators may be situated in a substrate comprised of the high permeability and permittivity materials.

In another embodiment, by partially overlapping the focal points of the transmit and receive lenses, the resolution may be improved, but at the expense of received power. As an example, if a transmit lens and a receive lens each have a focal point that is ten meters wide, and the focal point of the receive lens overlaps only two meters of the transmit lens focal point, the resolution is improved at the expense of received power, depending upon the focal point pattern. This is not an issue for close-in applications with significantly concentrated transmit power.

In another embodiment, by sweeping the focal point of the receive lens across the focal point of the transmit lens, the size and character of the focal points can be measured. By measuring the focal points and incorporating control over the focal points, the measured transmit focal point information can be used to optimize focusing as the wave penetrates various layers of materials, including metals.

In another embodiment, isotropic or anisotropic materials may be used for the metamaterials and/or antennas, radomes, probes.

In another embodiment, by physically or electrically sweeping the radar lens transmitting a continuous wave (i.e. unmodulated) tone, the receive lens will receive a modulated return based on the spatial frequencies or shapes of the target and the rate at which the unmodulated tone is swept past the target.

In another embodiment, the metamaterial elements are comprised of a plurality of resonators of varying designs in order to achieve a wide bandwidth response of the radar system.

BRIEF DESCRIPTION OF THE SEVERAL VIEWS OF THE DRAWING(S)

A detailed description of the invention is hereafter described with specific reference being made to the drawings.

DETAILED DESCRIPTION

Figure 1:
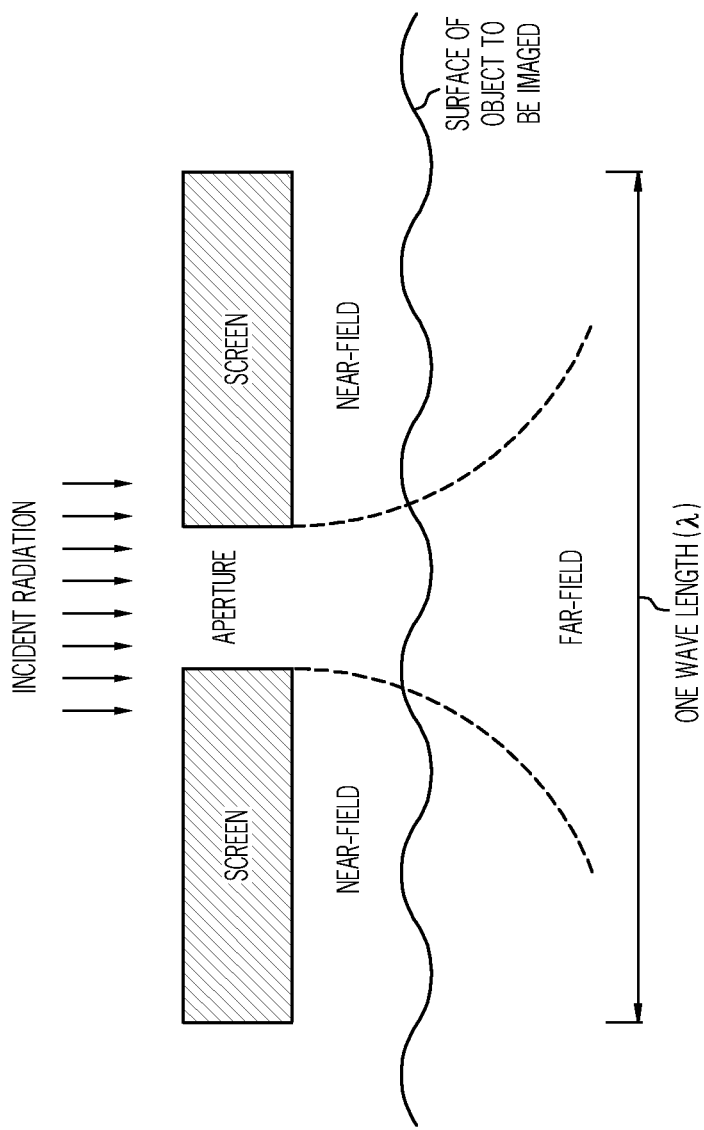
FIG. 1 is a schematic representation of the near-field diffraction from a subwavelength aperture.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
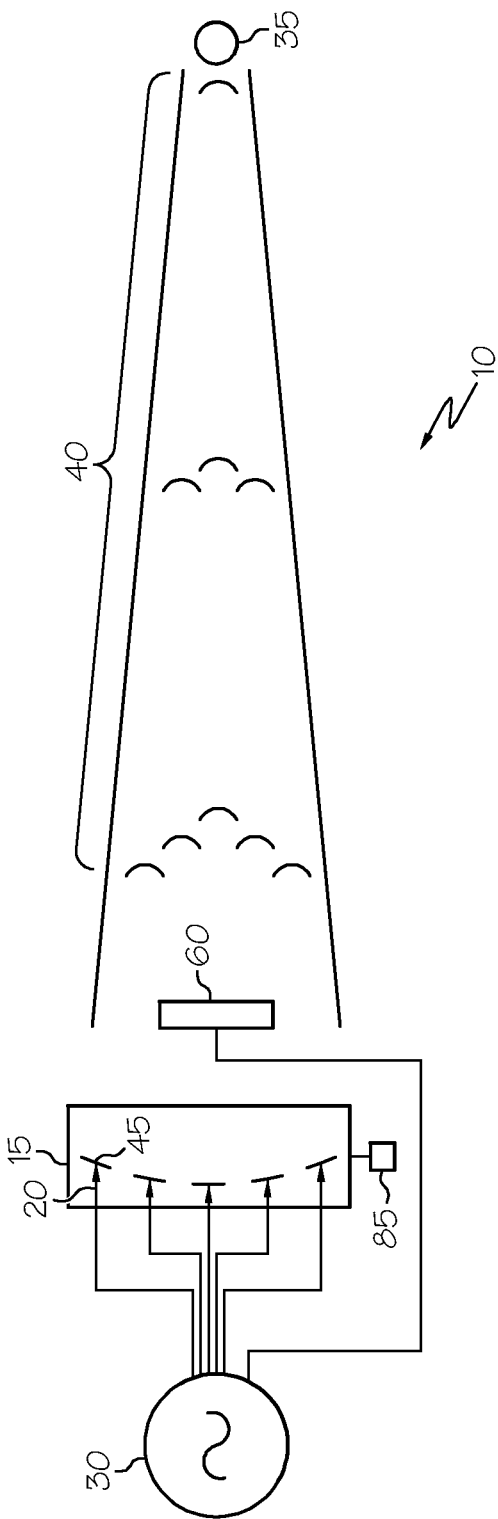
FIG. 2 is a block diagram of an embodiment of the present invention depicting sub-wavelength illumination using a metamaterial transmit array.

Referring to FIG. 2, in at least one embodiment the present invention results in sub-wavelength (sub-$\lambda$) illumination. Sub-wavelength illumination means illuminating a region smaller than the wavelength of the electromagnetic wave being used for the illumination. The implication for radar, and in particular ground-penetrating radar (GPR), building penetrating radar (BPR), and metal penetrating radar (MPR), is the ability to obtain a radar return from an area smaller than the size of the radiated wavelength with an appropriately designed lens/antenna which helps localize the radar return. The radar return from the sub-wavelength illuminated region can also be received and imaged using sub-wavelength imaging techniques in order to achieve new levels of radar resolution. Similar to the way in which time delay is used to phase standard phased array radar antenna elements, time delay can be used in a metamaterial array to change the focal point of the radiation to adjust the depth of a GPR scan or change other features of the array.

In one embodiment, the radar system 10 for producing sub-wavelength illumination includes at least one metamaterial transmit array 15 and at least one near-field stimulator or port 20 for inputting an electromagnetic signal 30 to the transmit array so that a sub-wavelength target 35 is illuminated with an electromagnetic wave 40. The transmit array 15 includes a plurality of metamaterial elements 45 which form a lens. The electromagnetic wave may have a frequency in the tens of kilohertz range all the way up to optical frequencies in the terahertz range. In some embodiments, the frequency is less than about 1 GHz. In at least one embodiment, the electromagnetic wave has a frequency between about 50 kHz and about 600 MHz, while in other embodiments the frequency is about 100 kHz.

Figure 5:
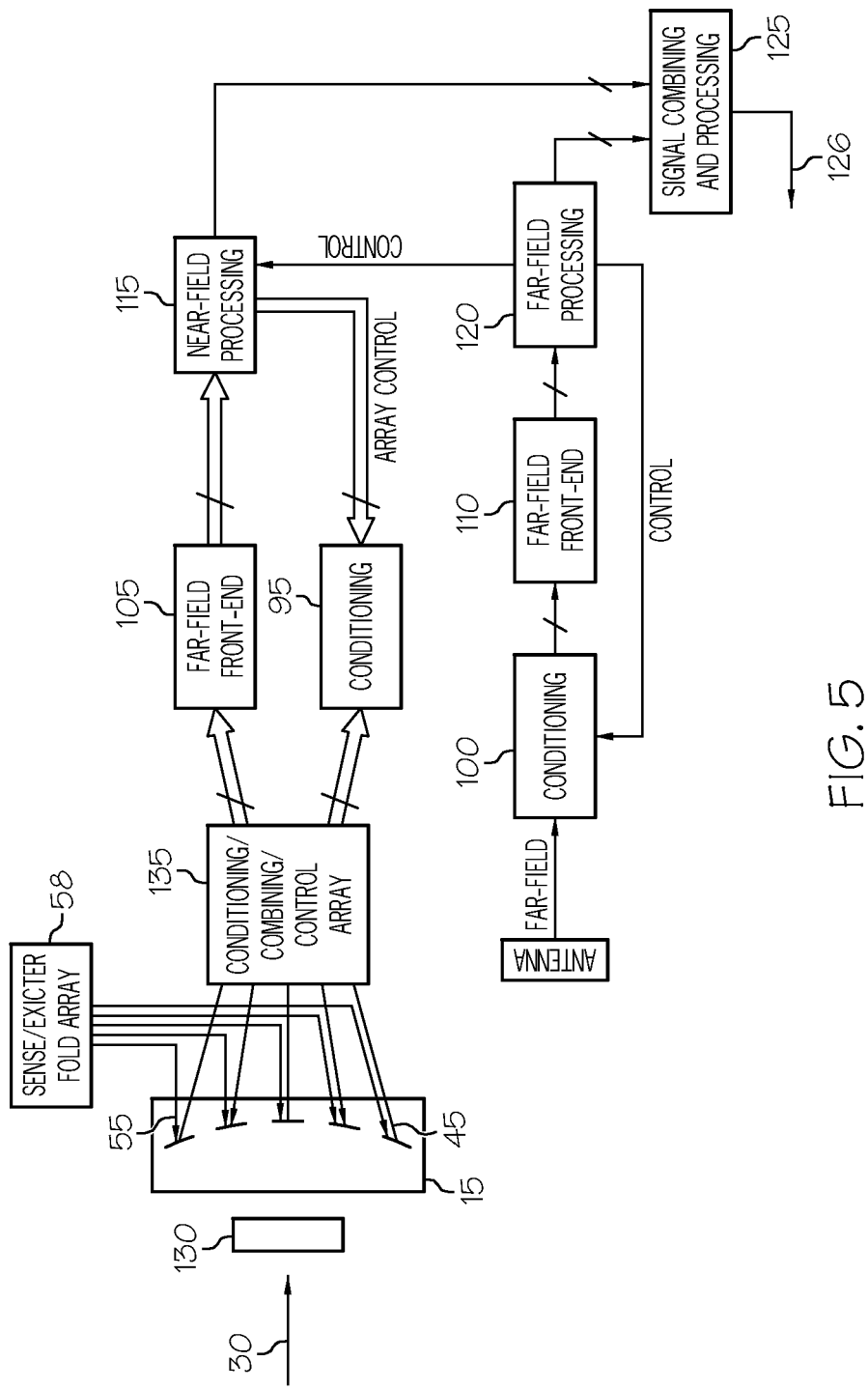
FIG. 5 is a block diagram of an embodiment of control, conditioning, and processing circuitry of the present invention.

In at least one embodiment, the near-field stimulator 20 is a near-field probe, a port, an antenna, or combination thereof. Near-field probes are placed very near to, but not in contact with the metamaterial elements in the transmit array. The near-field probes are used to stimulate (in an unmodulated or modulated manner) signals that would be utilized by metamaterial elements to achieve sub-wavelength illumination. As shown in FIG. 5, the near-field probes 55 are aligned with a metamaterial element 45 and in operative communication with a sense/exciter/feed array 58.

Referring again to FIG. 2, in at least one embodiment, the radar system includes an antenna 60. It should be noted that the term antenna could also be taken as meaning an antenna array. The antenna may be placed in front of, behind, to the side of, or inside the lens. The antenna 60 is used to stimulate the metamaterial elements 45 of the metamaterial transmit array 15 to produce near-field signals. Specifically, the EM signal source 30 and the stimulator 20 produce a wave in order to stimulate the metamaterial elements, which produces sub-wavelength illumination.

In some embodiments, both near-field probes or ports and antennas 60 are used to stimulate the metamaterial elements in the transmit array, as depicted in FIG. 2.

Figure 3:
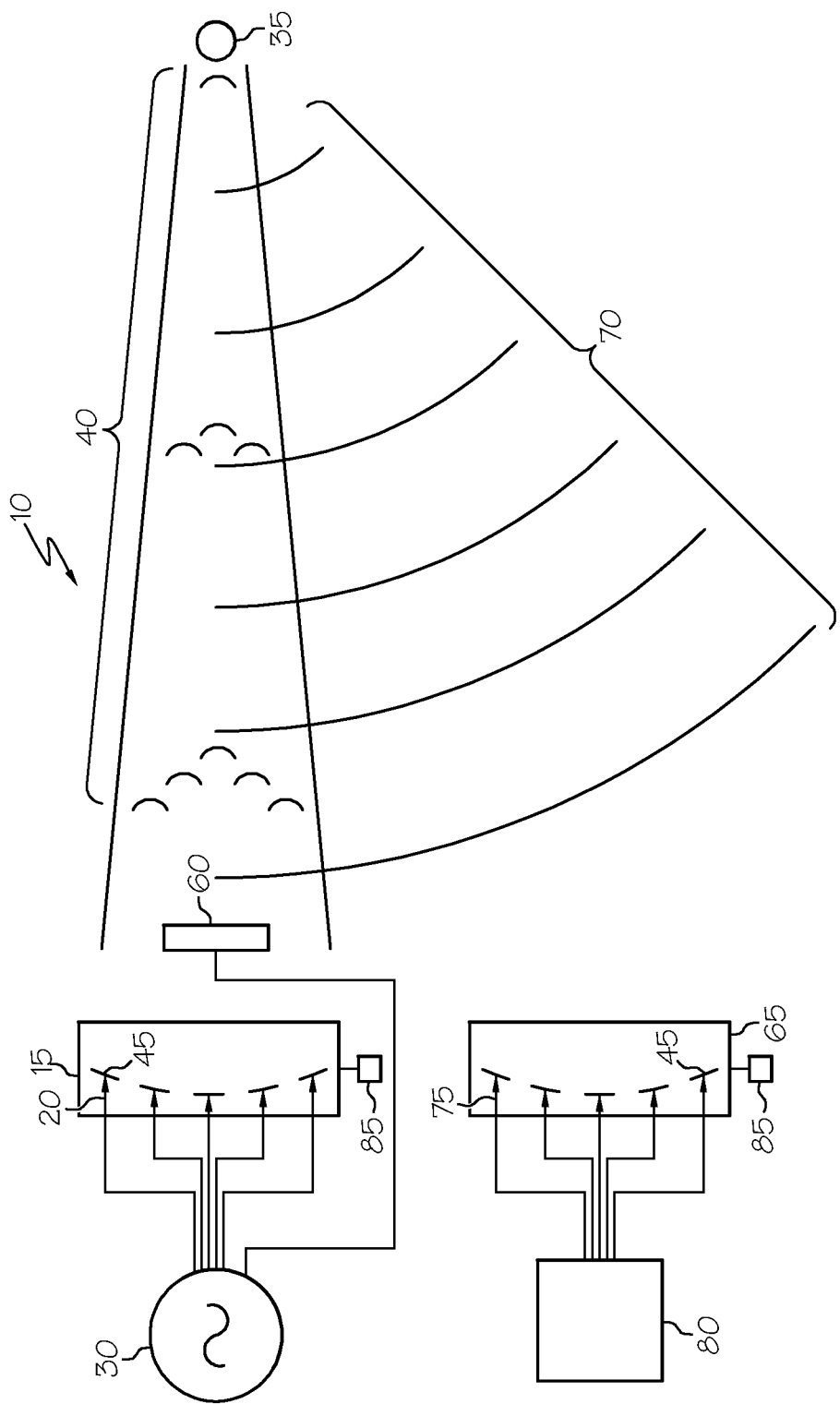
FIG. 3 is a block diagram of an embodiment of the present invention depicting sub-wavelength illumination and detection using metamaterial transmit and receive arrays.

Referring now to FIG. 3, in at least one embodiment, the radar system 10 for producing sub-wavelength illumination further includes at least one metamaterial receive array 65, constructed and arranged to receive a return wave 70 reflected from an object of interest or target, at least one near-field sensing component 75, and a far-field filter circuit 80. The return wave 70 comprises a near-field component and a far-field component, and the receive array comprises a plurality of metamaterial elements 45 forming another lens. The near-field sensing component 75 is in operative communication with the metamaterial elements 45 of the receive array 65. The sensing components 75 can be used to ensure that the array is operating as desired and/or to provide signal(s) to other circuits used to control the performance of the array to ensure the array is operating properly (i.e. feedback to optimize performance). The near-field sensing component may be a near-field probe, port or a high-impedance probe to sense the near-field and convert it into electrical form, thereby allowing processing of the near-field.

Electromagnetic signal sources are well known in the art. In general terms, an EM signal source may comprise a power source, an oscillator circuit that produces the EM signal, a modulator to control the duration of the signal, and an amplifier to strengthen the EM signal prior to transmission.

Antennas (or antenna arrays) are also well known in the art and will not be described here. The antenna 60 is coupled to the EM signal source 30 typically by a waveguide (not shown) or transmission line (not shown) and the antenna is designed to transmit and/or receive EM signals.

One way to create a metamaterial is by using dielectric resonators. Dielectric resonators can resonate in TM, TE or TM and TE modes. When the dielectric resonators are resonant in TM or TE modes then only one effective negative dielectric property (permittivity or permeability) is provided by the resonator so the other effective negative dielectric property is provided by a resonant mode occurring in the spacing between dielectric resonators. For cube shaped dielectric resonators, the third mode/resonance of the cube is usually a combined TM and TE mode, so that both negative permittivity and negative permeability are provided. This design eliminates any requirements on the spacing between elements and containing the fields within the cube. More information may be found in "Application of Cubic High Dielectric Resonator Metamaterial to Antennas," by Jaewon Kim and Anand Gopinath, presented in session 220 at IEEE Antenna and Propagation Society conference in June 2007, the entire content of which being incorporated herein by reference.

In one embodiment of the invention, high permittivity materials are used for one resonant mode and high permeability materials are used for the other resonant mode. The high permeability and high permittivity materials are then combined into one metamaterial cube lens for simultaneous TM/TE mode resonance within the cube. For situations in which the dielectric resonator provides a first resonant mode and the gap between resonators provides the second resonant mode, using high permittivity material in resonator and then using high permeability material in the gap, or vice versa, the size of the metamaterial elements may be dramatically reduced. Furthermore, efficiency is maintained in such a design by matching the wave impedance closely to free space or to the media the metamaterial elements are contained within. By using high permittivity materials combined with high permeability materials, efficient negative permeability and permittivity are achieved using one cube in which the separation between cubes is not critical. The benefits of a cube resonator are that they are low-loss compared to metallic metamaterial elements, they provide an isotropic response which simplifies metamaterial array and lens designs in some cases and size reduction features are built in by using alternating high dielectric constant materials.

In one example of a cube resonator, a ½" cube of high permittivity material, (such as AVX Corporations's X7R dielectric material with a relative permittivity near 3500, available at www.avx.com), is partially enclosed within a cup-shaped or open square design of high permeability interstitial material. The permeability of the interstitial material is matched, as closely as possible, to the permittivity of the dielectric material. The permeability and the permittivity are matched in order to create an impedance approximately equal to the characteristic impedance of free space, given by $Z_o = \sqrt{(\mu_o/\in_o)}$, or approximately 377 ohms. Thus, waves incident on the cube will not be reflected. Such design may be used at frequencies in the range of about 150 kHz to about 200 kHz.

Another way to create a metamaterial is by using Split Ring Resonators (SRR) and wires. Split Ring Resonator structures which are smaller than the size of a wavelength, but resonate in a way which captures and concentrates the near-field evanescent waves are known in the art. Proper design of an SRR causes the effective permeability and permittivity, and thus the refractive index, of a metamaterial to be controllable. One method of creating an SRR involves two metal disks that form a floating resonant inductor-capacitor (L-C) circuit and wire. The metal disks store electromagnetic energy. The majority of the energy stored in the electric field for the SRR is between the rings and is highest in magnitude close to the gaps in the rings. The effect of the SRR is amplification or concentration of the near-field/evanescent waves which results in high field strength in the SRR. The receive array is comprised of a plurality of SRRs, or metamaterial elements 45, created in an array and forming a circuit.

The gaps in the two metal disks which form each SRR act like capacitive plates. Each SRR has an electric field strength between these capacitive plates that can be orders of magnitude larger than the electric fields in the media surrounding the metamaterial.

The design of a traditional split ring resonator metamaterial element at 100 kHz would require significant volume. By combining low-loss, high permeability ferrites with high permittivity materials (e.g. X7R dielectric materials with relative permittivities near 3500) as the metamaterial elements or the substrate to the metamaterials, the size of the metamaterial elements are reduced significantly, the resonant storage energy balances resulting in wider bandwidths and the intrinsic wave impedance is maintained nearly at free space, preventing significant reflections at the dielectric material interfaces. Using metamaterial elements that utilize space more efficiently than a split ring resonator such as a spiral resonator, dielectric cubes or newer elements reduces size. Another size reduction technique is to increase the scanning rate in order to increase the received near-field frequencies. Increasing the scanning rate increases the bandwidth of the received signal, but wide-band metamaterial techniques have been developed to enable reception of wide-band near-field signals.

The fields of 100 kHz metamaterials extend significantly in undesirable directions where near-by structures adversely affect the overall performance. In order to minimize the effects caused by close-in structures, metamaterial or electronic band gap insulators are used to isolate the metamaterial arrays and simplify their design. Ferrite absorbers, layered media, resistor networks and other techniques are used to help minimize distortions caused by the insulators and to enhance their properties. In some embodiments, absorbers may be used without band-gap or metamaterial insulators.

In some embodiments the circuit formed by the metamaterial elements is an integrated circuit/resonator. In at least one embodiment, the circuit formed is a distributed circuit/resonator. In some embodiments, the circuit/resonator is formed by lumped elements and combinations of all the above elements.

The embodiment shown in FIG. 3 includes near-field sensing components 75. Through the use of near-field sensing components 75 in communication with the metamaterial elements 45, such as the metamaterial cubes or SRRs described above, the evanescent near-field signals may be detected without perturbing the resonating metamaterial.

One embodiment of a near-field sensing technique involves the use of near-field probes to recover the near-field. Used often in SNOM, near-field probes are brought near to a radiating object, without touching it, in order to sense the near-field. Near-field probes scan the radiating object, one pixel at a time, in order to completely reconstruct the object's image. As shown in FIG. 5, the near-field probes 55 are aligned with a metamaterial element 45 and in operative communication with a sense/exciter/feed array 58.

Another embodiment of a near-field sensing technique involves the use of high-impedance contact probes or at least one transmission line port. Unlike near-field probes, the high-impedance probes and ports make contact with the object being sensed.

The purpose of the near-field sensing components, whether they are near-field probes, high impedance probes, at least one transmission line port, or some other technique, is to sense the near-field and convert it into electrical form. Once converted, the electrical form of the near-field can then be processed, allowing for near-field enhancement and thus improved image resolution.

In order to maximize resolution, detection of both the near-field and the far-field is required. However, in a scanning system, separate processing of the near-field and far-field signals is preferable in some instances. In the embodiment shown in FIG. 3, a far-field filter circuit 80 is included which separates the near-field and the far-field. Specifically, the near-field is detected using a far-field metamaterial filter circuit which rejects the far-field, thereby enabling detection of the very low level near-field signal. A portion of the metamaterial receive array 65 can be designed to filter out frequencies by selecting a relative permittivity or relative permeability to be zero in order to null out the relatively narrow-band spectrum of the far-field and allow discrimination of the wider-band near-field.

In at least one embodiment of the present invention, elements, or control components 85, such as a varactor, pin diode network, gyrator, load/impedance pull, saturable magnetic, modulaton/frequency control, or other tunable resonator components or sub-circuits, or a combination thereof, may be included in the metamaterial element circuit of the transmit and/or receive arrays in order to allow features of the filter such as the center frequency, focal point and band edges to be tuned.

In some embodiments of the present invention, the amplitudes of the near-field and the far-field can be compared and used for discrimination. As mentioned above, the near-field signal is very weak because of its evanescent characteristics. Knowing that the far-field signal has a relatively large amplitude when compared against the near-field signal, and focusing in on a narrow frequency band, the far-field and near-field signals can be discriminated using equalizers, fast Fourier Transform (FFT) techniques, wavelet transform techniques, or other frequency-time filter techniques.

Figure 4:
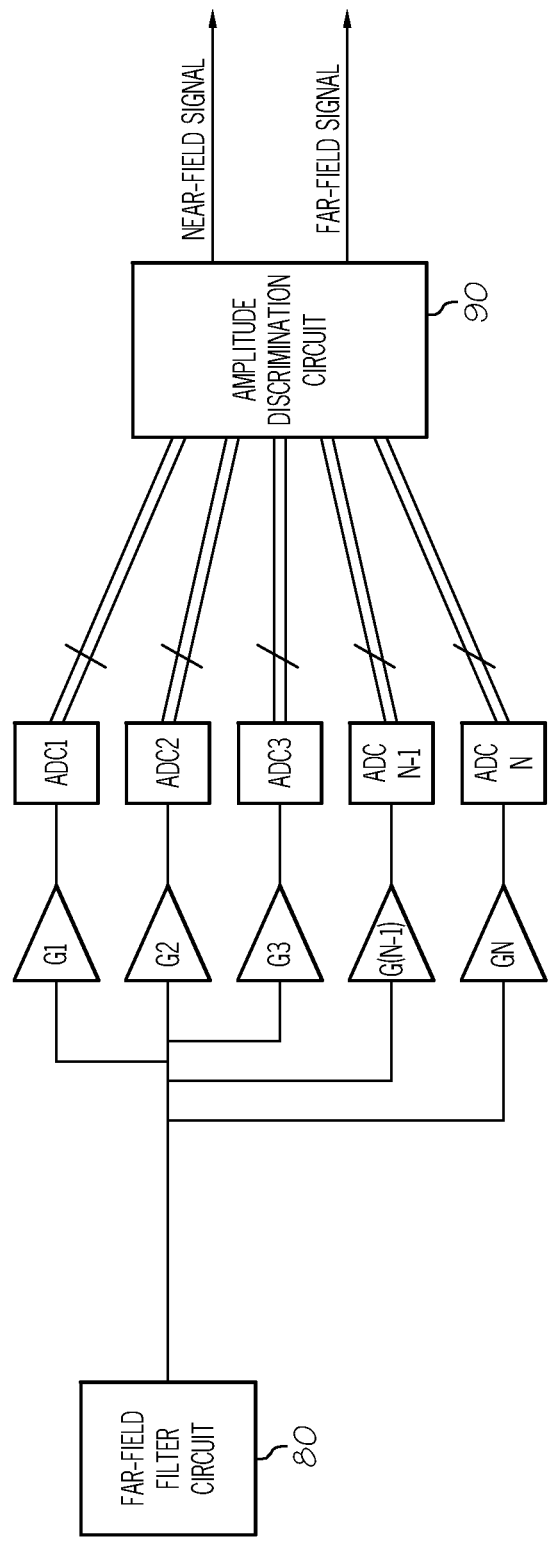
FIG. 4 is a block diagram of an embodiment of the present invention using amplitude discrimination circuitry.

FIG. 4 depicts an alternative embodiment for discriminating between the near-field and the far-field, both the near-field and far-field are received by a plurality of frequency selective amplifiers G (or frequency selective attenuators) and detectors or analog-to-digital converters (ADC). The output from the ADCs is fed into an amplitude discrimination circuit 90.

For radiofrequency (RF) reception, an RF front-end stage may be required prior to ADC detection. The front-end stage is used to combine, synchronize (for pulsed systems), and convert the RF frequencies received into signals at lower frequencies that can be processed more readily by a Digital Signal Processor (DSP) and/or other analog and digital circuitry. For low frequency metamaterials (e.g. 100 kHz), it may be possible to perform the conversion directly by the metamaterial array, DSP or other analog and digital circuitry.

A plurality of filters and ADCs is required to provide sub-range resolution. Part of the resolution of each ADC overlaps the previous. If lower level detection is desired, splitting the frequency range into multiple ADCs through the use of filters in order to achieve the noise floor required to enable detection of the near-field signal may be desirable. By enabling the high-fidelity detection of both a far-field signal and the near-field signal, the detection of the near-field superimposed on the far-field is possible, thereby improving the overall resolution of the resulting image. The same technique can be used to detect the entire near-field signal.

The amplifiers can be low-noise amplifiers or standard amplifiers. As mentioned above, attenuators can also be used, depending upon the return signal amplitudes anticipated and the overlap of each sub-range ADC. In a generalized system, there will be some number N of amplifiers/attenuators, with each being tuned to a different amplitude for lower-level reception. Also, there may be multiple amplifiers combined with filters and/or other signal conditioning circuitry in order to optimize reception.

In some embodiments, as depicted in FIG. 5, the present invention may include at least one, or a combination of, components or circuits which perform the following: near-field conditioning 95, far-field conditioning 100, near-field RF front-end 105, far-field RF front-end 110, near-field processing 115, far-field processing 120, and signal combining and processing 125, in order to produce a composite radar return 126.

The far-field conditioning is used for optimizing the power transfer between the antenna array and the RF front end, controlling the direction, beamwidth, bandwidth, center frequency, modulation, squint, polarization, front-to-back ratio, and other features of the antenna array to optimize reception of the far-field and transmission.

As described above, the front-end stage is used to combine, synchronize, and convert the RF frequencies received into signals at lower frequencies that can be processed more readily by a Digital Signal Processor (DSP) and/or other analog and digital circuitry.

Near-field and far-field processing refers to analog or digital signal processing, which is well-known by those skilled in the art.

Because resolution is maximized when both the far-field and near-field are used to produce an image of the object, a composite signal must be produced. The composite signal is a combination of the near-field and the far field features, resulting in maximized resolution.

In one embodiment, the composite signal(s) is generated from a plurality of signal samples. Most likely a scanning system, or equivalent scanning system via two or more antennas, will be required as in traditional radar imagers (e.g. SNOM applications).

Figure 6:
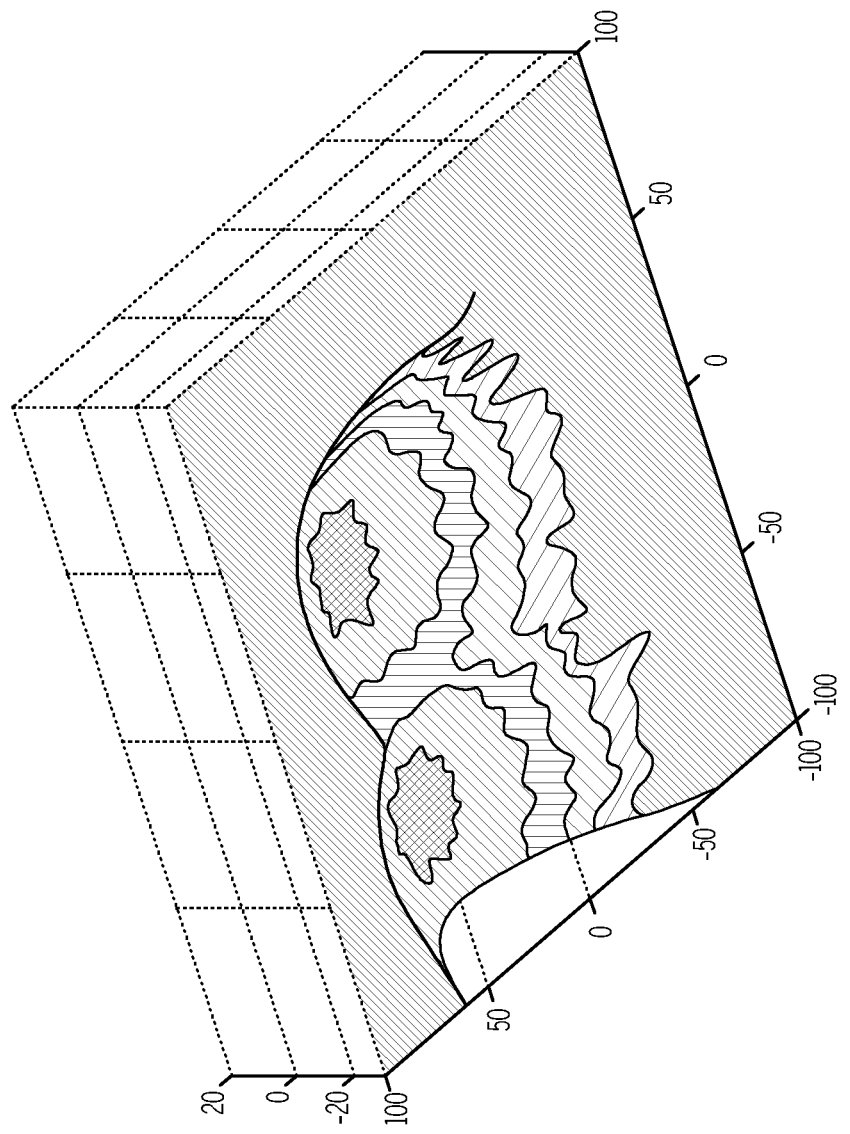
FIG. 6 is a graphical representations of a transmit array focal point and a receive array focal point partially overlapping.

Another method of achieving improved radar resolution is to partially overlap the antenna patterns of the transmit and receive arrays, as shown in FIG. 6. FIG. 6 depicts receive array focal point 140 partially overlapping transmit array focal point 145 at the region 150. By not pointing the receive array focal point 140 directly at the transmit array focal point 145, a smaller portion of the region illuminated by the transmit antenna is sensed by the receive array. In this manner, resolution is improved, but at the expense of power. Sweeping the receive array focal point (or peak gain) versus the transmit array focal point is similar to a technique used in some types of optical sensors to improve image resolution. This method has the added benefit of optimizing the focus of the array in a closed-loop manner.

In another embodiment, a 'superlens'-like system can be used in which the composite signal is generated from only one sample, rather than through scanning. By utilizing new techniques presented, it is possible to create a superlens which is free of the geometry requirements of a standard superlens (e.g. sensing via near-field probes or ports and generating the composite image via software.)

Because of temperature, vibration and circuit variations resulting from operational and environmental factors (e.g. temperature, humidity, etc.) it may be desirable to implement a control loop to ensure both the metamaterial and conventional arrays scan with the desired characteristics. For example, a control loop can ensure that the metamaterial filter is centered on the transmit signal and that the filter rejects the returned far-field.

In some embodiments, the present invention may also include circuitry in communication with the metamaterial transmit array, and in some instances with a patch antenna 130 or other antenna array as well. The circuitry is designed as a conditioning/combining/control array stage 135. The conditioning/combining/control array stage is circuitry used for detecting the near field signals from a near-field probe, high impedance probe, or other type of contact probe. It may also be used for stimulating metamaterial elements using a near-field probe. Also, the conditioning/combining/control array stage can be used for steering the angle, beamwidth, bandwidth, center frequency, modulation, squint, polarization, focus of the main beam of the metamaterial array for reception or transmission via the use of ports or probes or a separate patch or other antenna array. It may provide the appropriate signals to the patch or other antenna array. It may control the center frequency, bandwidth and/or possibly the order of the metamaterial filter by the use of tuning elements such as varactors, gyrators, pin diode switched elements, load/impedance pull, saturable magnetics, modulation/frequency control, or other tunable resonator components or sub-circuits, or a combination thereof. And, it may be used for optimizing power transfer between sensing/stimulating arrays and the control circuitry.

In some embodiments, the present invention can be used for improved metal penetrating radar. Electomagnetic frequencies from fractions of a hertz (Hz) to a few MHz effectively penetrate metal.

Also, in some embodiments, the present invention can be used for clutter rejection. A far-field return generates both a near-field wave and a far-field wave when it diffracts. Rocks, soil variations, and other buried objects with features dimensionally smaller than the wavelength of an incident wave, located between the desired object (or region) of interest and the radar system, add noise to any radar return. These far-field components will appear as clutter noise to a conventional Ground-Penetrating Radar (GPR).

However, these noise components of the far-field return are similar to the return produced by metamaterials. By placing metamaterial elements (e.g. resonators) with known electromagnetic characteristics near the object to be imaged, the return noise is better defined, thereby allowing significant portions of the return noise to be subtracted out from the far-field return. After the noise is subtracted out, the far-field return can be processed, thus improving imaging resolution of the object of interest. These far-field components will appear as clutter noise to a conventional Ground-Penetrating Radar (GPR).

In some embodiments, clutter noise can be rejected by "seeding" the ground with sub-wavelength sized resonators for controlled diffraction effects. The resonators can be dispersed on or in the ground near the object to be imaged. The resonators are preferably optimized to enable detection of a return wave reflected from an object in which the return wave includes dimensional information of the object smaller than the incident wavelength.

Seeding is also effective in detecting changes in a location in the ground by determining seed locations at the onset of seeding and sensing a change in their locations. A baseline is determined by measuring a radar image or signature of a region immediately following placement of seeds. Any disturbances or change in condition in the seeded region can be determined by re-measuring the image or signature and comparing it to the initial radar image or signature. Clearly there are a number of important uses for seeding, including detecting buried mines, unexploded ordinances (UXOs), tunnels, utility lines, and improvised explosive devices (IEDs)

In some embodiments, the seeded sub-wavelength resonators are used to perform the near-to-far field conversion to enhance GPR imaging resolution.

In other embodiments, clutter rejection is accomplished by narrow-banding, narrow-beaming, modulation techniques, and time domain techniques. Though wide-band metamaterials have been demonstrated, most metamaterials are narrow-band. Because of their resonant structure, metamaterials can be designed to provide their unique properties over a relatively narrow bandwidth and over relatively narrow angles of incidence.

Benefits of narrow-band radar are that the radar becomes less susceptible to interference. A narrow-band antenna/lens is also less susceptible to noise pickup, antenna-ground bounce induced ringing, generates less interference, and is better matched to optimize transmit and receive power to provide a wider dynamic range than is possible with a wide-band system. Generating the transmit signal for a narrow-band radar has been demonstrated and is within the state-of-the-art. However, the use of near-field techniques as presented herein to improve the resolution of GPR and Building Penetrating Radar (BPR) and Metal Penetrating Radar (MPR) is novel and inventive.

It is desirable to achieve a GPR/BPR resolution of centimeters. To achieve centimeter resolution with standard radar requires many Giga-Hertz of bandwidth. State of the art sub-wavelength techniques have been achieving between about 3 and 700 fold sub-wavelength resolution improvement over the diffraction limit. For narrow-band radar utilizing sub-wavelength techniques with 100 fold improvement in resolution may use an operating frequency of approximately 300 MHz. This is a frequency at which soil attenuation is beginning to increase, but it is low enough in attenuation that significant soil penetration can occur with reasonable transmit power levels. Another benefit of using lower frequencies is that free-space path loss is reduced, optimizing return power of the near and far field signals.

Reducing the effective beam width (i.e. narrow-beam) of the GPR also reduces received artificial and environmental interfering signals and noise, reduces clutter and helps facilitate scanning which is often necessary for near-field techniques.

A narrow-band modulation technique (e.g. unmodulated wave, Gaussian damped cycle, single cycle, etc.) may be used in conjunction with knowledge of focal point and ultra-wide-band-like techniques (e.g. time correlation) to reduce overall system noise, including rejection of clutter.

In some embodiments of the present invention, the sub-wavelength illumination can be used for metal penetrating radar. Although sub-wavelength illumination is not required for metal penetration, as presented earlier, sub-wavelength illumination does improve the resolution of metal penetrating radar. Achieving optimal resolution at metal penetrating frequencies will require a combination of techniques such as sub-wavelength illumination along with the use of near-field sensing components and feedback techniques such as scanning the receive lens focal point across the transmit lens focal point to detect and fine-tune subwavelength focusing.

In some embodiments of present invention, the sub-wavelength illumination can be used as a directed energy weapon. A directed energy weapon using sub-wavelength illumination techniques is superior to laser systems because of the lower path loss, immunity to cloud cover, immunity to obscuration caused by the burning process and provides the new capability of directed electromagnetic damage. Directed electromagnetic damage includes generating an electromagnetic pulse (EMP) as well as simply producing continuously high localized field strength. Using either EMP or high field strength, the electronics in a target can be damaged (including situations where the target is EMI/EMP shielded) without damaging the electronics of nearby electronic systems and without requiring the transmit power be as high as that necessary to burn through the walls of the target system (i.e. metal penetrating capability). Circuits designed to protect sensitive electronics from EMP would be ineffective against such a weapon as the sensitive electronics would be exposed directly to high-level electromagnetic fields penetrating the metal enclosure housing the electronics.

In at least one embodiment of the present invention, the sub-wavelength illumination can be used for clutter rejection. By focusing the energy of the incident radiation on a sub-wavelength sized region, the signal to noise of the return signal from the sub-wavelength region is increased. The techniques described above for clutter rejection can be used in conjunction with sub-wavelength illumination.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A device for penetrating a material of a target, the device comprising:
   a transmit array comprising a plurality of metamaterial elements forming a lens, the array configured to transmit a radar range frequency electromagnetic wave;
   a stimulator configured to stimulate the metamaterial elements in order to produce the electromagnetic wave that illuminates the target with sub-wavelength sized illumination; and
   a control component configured to control a focal point of the lens.

2. The device of claim 1, wherein the material is metal.

3. The device of claim 1, wherein the control component configured to control a focal point of the lens is further configured to use a time delay to control the focal point of the lens.

4. The device of claim 1, wherein the stimulator is selected from the group consisting of a near-field probe, port, an antenna, or a combination thereof.

5. The device of claim 1, wherein the control component is selected from the group consisting of tunable resonant components and tunable resonant sub-circuits.

6. The device of claim 1, wherein the electromagnetic wave has a frequency of less than about 1 hertz (Hz) to about 1 MHz.

7. The device of claim 1, wherein the lens is a first lens, the device in combination with:
   a receive array configured to receive a return wave reflected from the target, the receive array comprising a plurality of metamaterial elements forming a second lens; and
   a near-field sensing component in operative communication with the receive array.

8. The combination of claim 7, wherein the control component is a first control component, the combination further comprising:
   a second control component configured to control a focal point of the second lens.

9. A device for penetrating a material of a target, the device comprising:
   means for transmitting a radar range frequency electromagnetic wave, the means for transmitting comprising a plurality of metamaterial elements forming a lens;
   means for stimulating the metamaterial elements in order to produce the electromagnetic wave that illuminates the target with sub-wavelength sized illumination; and
   means for controlling a focal point of the lens.

10. The device of claim 9, wherein the material is metal.

11. The device of claim 9, wherein the means for controlling comprises means for controlling a time delay to control the focal point of the lens.

12. The device of claim 9, wherein the electromagnetic wave has a frequency of less than about 1 hertz (Hz) to about 1 MHz.

13. The device of claim 9, wherein the lens is a first lens, the device in combination with:
   means for receiving a return wave reflected from the target, the means for receiving comprising a plurality of metamaterial elements forming a second lens; and
   means for sensing a near-field in operative communication with the receive array.

14. The combination of claim 13, wherein the means for controlling is a first means for controlling, the combination further comprising:

a second means for controlling a focal point of the second lens.

15. A system for penetrating a material of a target, the system comprising:
- a transmit array comprising a plurality of metamaterial elements forming a first lens, the array configured to transmit a radar range frequency electromagnetic wave;
- a stimulator configured to stimulate the metamaterial elements in order to produce the electromagnetic wave that illuminates the target with sub-wavelength sized illumination;
- a first control component configured to control a focal point of the first lens;
- a receive array configured to receive a return wave reflected from the target, the receive array comprising a plurality of metamaterial elements forming a second lens; and
- a near-field sensing component in operative communication with the receive array.

16. A device for penetrating a material of a target, the device comprising:
- a transmit array comprising a plurality of sub-wavelength sized resonator elements forming a lens, the array configured to transmit a radar range frequency electromagnetic wave;
- a stimulator configured to stimulate the sub-wavelength sized resonator elements in order to produce the electromagnetic wave that illuminates the target with sub-wavelength sized illumination; and
- a control component configured to control a focal point of the lens.

17. The device of claim 16, wherein the sub-wavelength sized resonator elements comprise high permeability and high permittivity materials.

18. The device of claim 16, wherein the sub-wavelength sized resonator elements are situated in a substrate comprised of high permeability and high permittivity materials.

* * * * *